United States Patent [19]

Mitsui et al.

[11] 4,441,584
[45] Apr. 10, 1984

[54] AC ELEVATOR CONTROL SYSTEM

[75] Inventors: Nobuo Mitsui; Yasuyuki Maeda; Tomiaki Kurihara; Seiya Shima; Takanobu Hatakeyama, all of Katsuta; Katsu Komuro, Mito, all of Japan

[73] Assignee: Hitachi, Ltd., Tokyo, Japan

[21] Appl. No.: 289,040

[22] Filed: Jul. 31, 1981

[30] Foreign Application Priority Data

Aug. 1, 1980 [JP] Japan .................................. 55-105038

[51] Int. Cl.³ .............................................. B66B 1/28
[52] U.S. Cl. .................................................. 187/29 R
[58] Field of Search ................... 187/29; 318/757, 807

[56] References Cited

U.S. PATENT DOCUMENTS

| | | | |
|---|---|---|---|
| 3,667,016 | 5/1972 | Dunfield et al. | 318/807 |
| 3,710,218 | 1/1973 | Roundy et al. | 318/807 |
| 4,227,138 | 10/1980 | Espelage et al. | 318/807 X |
| 4,292,577 | 9/1981 | Cesarz et al. | 318/807 X |
| 4,319,665 | 3/1982 | Komuro et al. | 187/29 |

Primary Examiner—Bernard Roskoski
Assistant Examiner—W. E. Duncanson, Jr.
Attorney, Agent, or Firm—Antonelli, Terry & Wands

[57] ABSTRACT

In an AC elevator system employing a three-phase induction motor for driving an elevator car, the primary voltage supplied to the induction motor is controlled to control the motoring torque in the acceleration mode and in the rated-speed running mode, while, in the deceleration mode, a power converter unit supplies AC power of low frequency to the induction motor to apply regenerative braking.

21 Claims, 11 Drawing Figures

AC ELEVATOR CONTROL SYSTEM

This invention relates to a system for controlling an AC elevator car driven by a three-phase induction motor.

The comfortableness to ride and the accuracy of landing at stopping floors are strictly demanded for elevator cars.

An AC elevator control method satisfying such a demand by employment of a high-speed induction motor and a low-speed induction motor is proposed in, for example, U.S. Pat. No. 3,876,918 and U.S. Pat. No. 4,319,665. The proposed method is such that, depending on the error between the speed command signal and the speed feedback signal, the AC voltage applied to the high-speed induction motor is controlled when the elevator car is accelerated or running at the rated speed, while the DC braking current supplied to the low-speed induction motor is controlled when the elevator car is decelerated. Therefore, according to this elevator control method, both the motoring torque and the braking torque can be controlled to satisfactorily control acceleration and deceleration of the elevator car.

However, the proposed control method is defective in that the double-winding motor structure is quite expensive and the application of DC braking torque for the control of the deceleration of the elevator car results in a great energy loss. Especially, such an energy loss is very large and is not negligible in the case of an elevator car which is repeatedly started and stopped at a high frequency.

On the other hand, a method for controlling an induction motor is widely known from, for example, U.S. Pat. No. 3,568,021 and U.S. Pat. No. 3,940,669 each of which discloses a so-called inverter system in which an inverter is employed for the control of the frequency of an AC power supply voltage supplied to an induction motor.

An application of such an inverter to an AC elevator system is proposed in Japanese Patent Application Laid-Open No. 137845/77 (laid open on Nov. 17, 1977). The proposal is such that, depending on the elevator car speed command, the voltage and frequency of the AC power supplied to the induction motor is progressively increased during acceleration of the elevator car, while the AC voltage and frequency are progressively decreased during deceleration of the elevator car. According to the proposed method, therefore, an induction motor of a single winding structure can be employed, and the power consumption can be reduced since regenerative braking is applied during deceleration of the elevator car.

However, according to the so-called inverter system it is necessary to control a large current supplied during acceleration of the elevator car, so that the capacity of the inverter used for the control exceeds necessarily the motor starting power requirement to such an extent that its value will become several times as large as the rated capacity of the induction motor. Consequently, the proposed method has been defective in that the inverter apparatus requires a very large capacity and is therefore expensive, and because of the above defect, the method has not yet been put into practical use.

It is a primary object of the present invention to provide a novel and improved AC elevator control system employing a three-phase induction motor, in which control elements of small capacity can be employed, thereby reducing the power consumption.

Another object of the present invention is to provide an AC elevator control system in which the number of necessary parts can be reduced thereby attaining a reduction in the cost and complexity of the system.

It is a principal feature of the AC elevator control system according to the present invention that AC power from a three-phase AC power source is supplied to an elevator car driving induction motor to thereby control the motoring torque when the elevator car is accelerated or running at its rated speed, while AC power at a frequency lower than that of the AC power source is supplied to the induction motor to thereby effect the regenerative braking when the elevator is decelerated.

Another important feature of the present invention resides in the fact that a full-wave bridge circuit including a plurality of control elements is connected at its AC terminals to the three-phase AC power source, the connections between the control elements being suitably switched over to serve both the control of the motoring torque and the control of the braking torque, and that the full-wave bridge circuit is provided by a single-phase full-wave bridge structure.

Other objects, features and advantages of the present invention will become apparent from the following detailed description of preferred embodiments thereof taken in conjunction with the accompanying drawings, in which.

Figure 1:
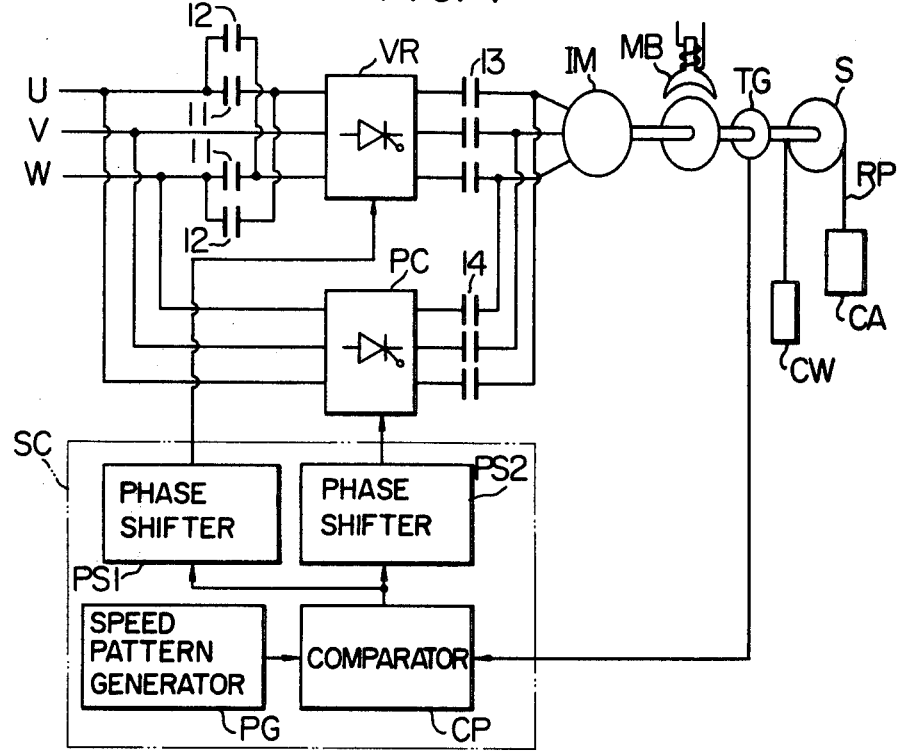
FIG. 1 is a block diagram of an embodiment of the AC elevator control system according to the present invention.

Referring now to FIG. 1 which is a block diagram of an embodiment of the AC elevator control system according to the present invention, an elevator car CA a counterweight CW are suspended from the opposite ends respectively of a rope RP trained around a traction sheave S. A three-phase induction motor IM, an electromagnetic brake unit MB and a tachometer generator TG are coupled to the sheave S. Therefore, the elevator car CA is driven to run up and down by controlling the three-phase induction motor IM.

A three-phase AC power source U, V, W is connected to a motoring torque control unit VR through main contactors 11 for up movement and main contactors 12 for down movement. By closing either the main contactors 11 or 12, the AC power to be supplied to the motoring torque control unit VR is caused to have its phase rotation direction corresponding to the desired run direction of the elevator car CA. The output from this motoring torque control unit VR is supplied to the induction motor IM through main contactors 13 for motoring purposes which are closed when the elevator car CA is accelerated and when the elevator car CA runs at its rated speed. The AC power from the three-phase AC power source U, V, W is also supplied to a power converter unit PC, and the output from this power converter unit PC is supplied to the induction motor IM through main contactors 14 for deceleration purposes which are closed when the elevator car CA is decelerated.

The speed signal appearing from the tachometer generator TG is fed back to a speed control unit SC. This speed control unit SC includes a speed pattern generator PG and a speed comparator CP. The signal indicative of the speed error between the speed pattern signal and the speed feedback signal is applied from the speed comparator CP to phase shifters PS1 and PS2 which control the motoring torque control unit VR and the power converter unit PC respectively so as to cancel the speed error.

As described later in more detail, the power converter unit PC in the embodiment of the present invention is composed of a forward converter for deriving DC power from the AC power supplied from the AC power source and a reverse converter or inverter for converting the DC power into low-frequency AC power.

In the AC elevator control system having the structure described above, the primary voltage is controlled by the motoring torque control unit VR when the elevator car CA is accelerated and when the elevator car CA runs at its rated speed, so that the induction motor IM is controlled according to the output signal from the speed pattern generator PG thereby accelerating the elevator car CA or running the elevator car CA at the rated speed.

When the elevator car CA is to be decelerated, the main contactors 13 for acceleration purpose are opened and the main contactors 14 for deceleration purpose are closed. Consequently, the low-frequency AC power is supplied from the inverter of the power converter unit PC to the induction motor IM.

Figure 2:
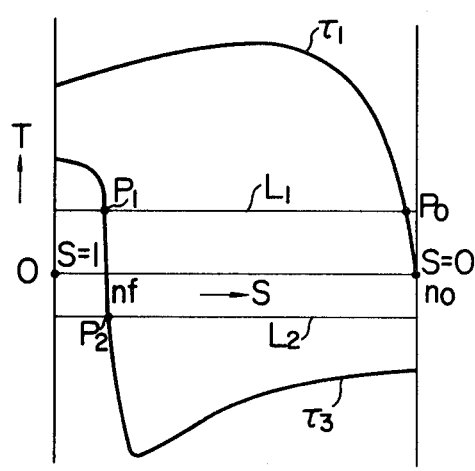
FIG. 2 is a graph showing torque characteristics of the three-phase induction motor IM shown in FIG. 1.

The frequency of the low-frequency AC power supplied from the inverter of the power converter unit PC is selected to be 1/5 to 1/10 of that of the AC power source U, V, W. (Then, the characteristic will be analogous to that of a two-speed elevator system employing a multipole induction motor in which the number of poles is five to ten times as many as that of the induction motor IM.) When the low-frequency AC power having such a frequency is supplied from the inverter of the power converter unit PC to the induction motor IM, the state of regenerative braking occurs in the induction motor IM thereby causing deceleration of the elevator car CA while recovering the energy produced as a result of regenerative braking. FIG. 2 shows the relation between the torque T and the slip S in such a case.

Suppose now that the elevator car CA runs upward in a full-loaded condition loaded with a heavy load as shown by the load torque line L1, then, the elevator car CA continues to run upward at a constant speed given by the intersection between the load torque line L1 and the torque curve $\tau_1$ of the induction motor IM. At the point of commencement of deceleration, the torque curve $\tau_1$ of the induction motor IM is changed over to the torque curve $\tau_3$, with the result that the torque of the induction motor IM changes now along the torque curve $\tau_3$, and the elevator car CA is decelerated due to application of the regenerative braking torque until the speed is reduced to the level of the synchronous speed nf determined by the frequency of the low-frequency AC power supplied from the inverter of the power converter unit PC. The kinetic energy of the proportion corresponding to $1-(nf/no)^2$ is converted into the electrical energy by the power generating characteristic of the motor, and the electrical energy is returned to the power source. The symbol "no" represents the synchronous speed determined by the frequency of the AC power source U, V, W.

Figure 3:
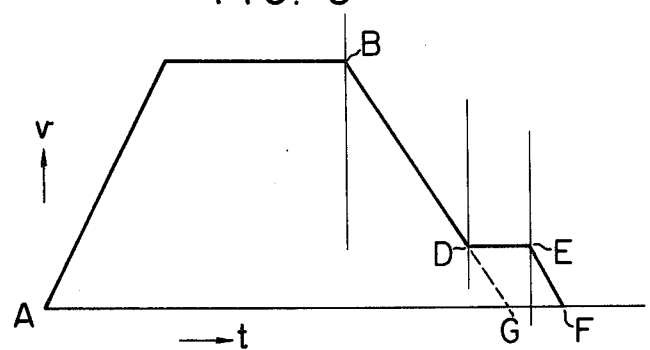
FIG. 3 is a graph showing a speed characteristic of the elevator car.

After the elevator car CA is decelerated in the manner described above, the elevator car CA runs stably at the point of balance P1 (or P2) between the torque characteristic $\tau_3$ determined by the power converter unit PC and the loaded condition L1 (or L2) at that time. Then, at the position of final stop, the power supply is turned off by opening the main contactors 11 (or 12), and, at the same time, the elevator car CA is brought to a stop by the electromagnetic brake unit MB. Thus, an operation characteristic curve as shown in FIG. 3 is obtained. In the curve, the range B-D-E is controlled by the inverter. The operation characteristic shown in FIG. 3 is generally analogous to that exhibited by the drive by a conventional two-speed motor. However, in the case of the drive by a conventional two-speed motor, the speed ratio of 1/3 to ⅓ is a limit due to the manufacturing limitation on the motor and from the aspect of the cost of the motor. In contrast, the speed ratio can be reduced to about 1/10 according to the present invention, so that the accuracy of floor landing and the stop shock alleviation which are important factors for the elevator car operation can be greatly improved. Further, the kinetic energy can be substantially completely regenerated since the kinetic energy of the elevator car CA during deceleration is proportional to the second power of the speed. In other words, when nf/no=0.1, the kinetic energy of a quantity $E=1-0.1^2=0.99$ can be utilized for regeneration.

Figure 4:
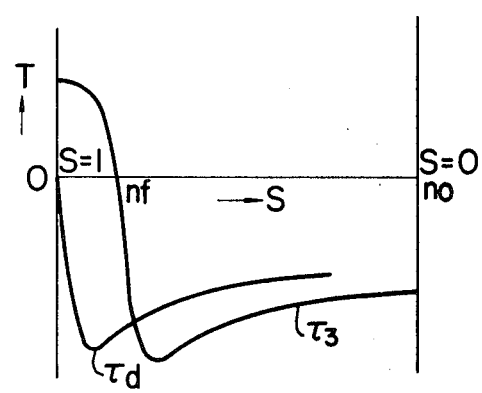
FIG. 4 is a graph showing other torque characteristics of the induction motor IM.

Alternatively, the DC braking technique disclosed in U.S. Pat. No. 3,876,918 cited hereinbefore can also be utilized so as to bring the elevator car CA to a stop at a point G while maintaining the deceleration between the points B and D, as shown by the dotted line DG in FIG. 3. The relation between the torque T and the slip S in this case is as shown in FIG. 4. Referring to FIG. 4, the elevator car CA is decelerated along the regenerative braking torque curve $\tau_3$ representing the low-frequency torque characteristic from the high synchronous speed.

(In this case too, the speed control unit SC shown in FIG. 1 carries out the speed feedback control by comparing the speed feedback signal with the speed pattern signal.) Then, at a speed in the vicinity of the synchronous speed nf determined by the output frequency of the inverter of the power converter unit PC, switchover from the regenerative braking torque curve $\tau_3$ to the DC braking torque curve $\tau_d$ takes place. As soon as the elevator car CA is stopped at the floor landing level, the electromagnetic brake unit MB is energized and kept in the energized state.

The DC braking torque $\tau_d$ approaches the value of zero at the speed which is nearly zero. Therefore, at the vicinity of this speed zero point, the control may be effected by using the electromagnetic brake unit MB without resorting to the DC braking torque $\tau_d$. The range D–F in FIG. 3 is preferably as short as possible. This may be attained by detecting the load of the elevator car CA on the basis of the level of the motor current in the running condition of the elevator car CA or the level of the braking current in the decelerating condition and controlling the timing of energization and the braking force of the electromagnetic brake unit MB, so that the curve of deceleration due to the application of the braking force by the electromagnetic brake unit MB may become a linear extension of the deceleration curve up to that time. This manner of control can be achieved relatively simply and inexpensively.

It will be understood from the above description of the embodiment that the motoring torque control unit VR controls the motoring torque applied for accelerating the elevator car CA, and the power converter unit PC supplies the AC power of a frequency lower than that of the AC power source, to the induction motor IM for controlling the deceleration of the elevator car CA. Therefore, not only the desired power saving can be achieved by the regeneration of power during deceleration of the elevator car CA as described above, but also the equipment capacity of the power converter unit PC can be reduced for the reasons which will be described presently.

In this embodiment, the power converter unit PC is merely required for providing an AC power output of a frequency lower than that of the AC power source. On the other hand, as is commonly known, the equipment cost of the power converter unit PC can be reduced in proportion to its output frequency. Therefore, when the output frequency of the power converter unit PC is selected so as to reduce the synchronous speed of the induction motor IM to be about 1/10 of the rated speed of the elevator car CA, its equipment cost can be reduced to about 1/10 of that of the case in which the power converter unit PC is solely relied upon for the control of acceleration and deceleration of the elevator car CA.

Further, the use of the power converter unit PC for the sole purpose of deceleration control provides such an additional advantage that the output of the inverter can be reduced by the amount corresponding to two times the loss of torque due to the losses occurring in the mechanical system of the elevator (for example, the gear loss in the hoist and the friction loss in the guide shoes guiding the cage), compared with the case in which the power converter unit PC is used for both acceleration control and deceleration control.

Further, the power converter unit PC in this embodiment need not carry out frequency control continuously over a wide frequency range. Therefore, the phase shifter $PS_2$ connected to the power converter unit PC can be made simpler in circuit configuration and more economical than the conventional one which is connected to the conventional power converter unit designed to carry out frequency control continuously over a wide frequency range. Thus, when, for example, the elevator car CA is to be controlled in the manner described with reference to FIGS. 2 and 3, the power converter unit PC is merely required to be capable of controlling the AC output to have a predetermined frequency. On the other hand, when the elevator car CA is to be controlled in the manner described with reference to FIG. 4 in which the DC braking torque $\tau_d$ is applied for stopping the elevator car CA, the power converter unit PC is merely required to be capable of controlling the AC output at zero frequency.

In the above description, the AC output frequency of the power converter unit PC is selected to be constant. However, a plurality of frequencies lower than that of the AC power source may be generated from the power converter unit PC, and the output frequency may be successively switched over to lower ones depending on the elevator car position or the motor speed. Although the structure of the phase shifter $PS_2$ becomes complex in such a case, while the deceleration control can be improved, the circuitry of the phase shifter $PS_2$ is still simpler than that connected to the conventional power converter unit designed to continuously carry out the frequency control over a wide frequency range.

The above description has referred to the use of the power converter unit PC for the deceleration control. It is necessary to run the elevator car CA at a low speed in the case of, for example, maintenance and inspection of the elevator car CA. When such a low speed run is required, the elevator car CA is to be run at the low speed determined by the output frequency of the power converter unit PC. When the low speed above described is too slow for the maintenance and inspection purpose, a plurality of frequencies as described above may be provided, and a suitable one of them may be utilized.

Figure 5:
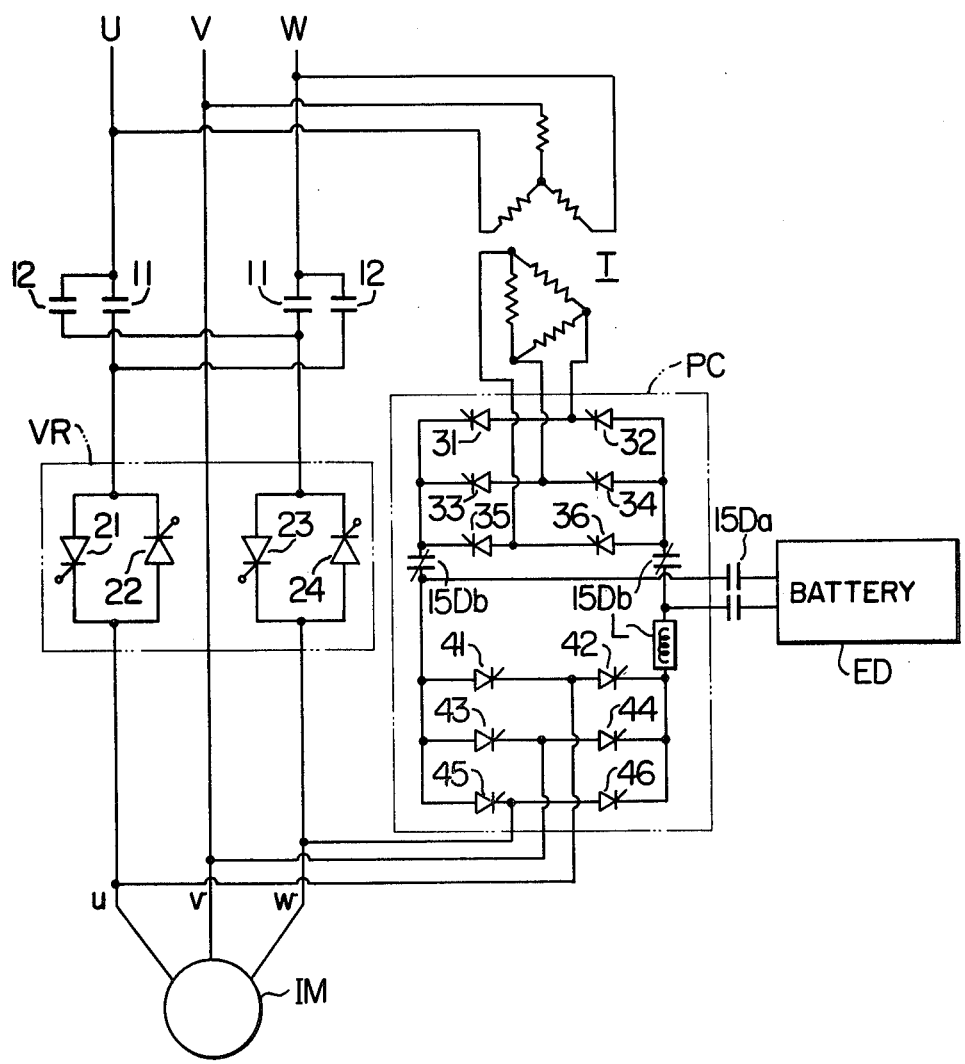
FIG. 5 is a circuit diagram of a preferred embodiment of the AC elevator control system according to the present invention.

FIG. 5 is a circuit diagram of a preferred embodiment of the elevator control system of the present invention.

In the embodiment shown in FIG. 5, the motoring torque control unit VR includes two pairs of anti-parallel-connected thyristors 21 to 24, and the power converter unit PC is composed of a forward converter including thyristors 31 to 36 and an inverter including thyristors 41 to 46. The power converter unit PC is connected at its AC input terminals to the AC power source U, V, W through a transformer T. The above arrangement provides such advantages that the breakdown voltage level of the thyristors 31 to 36 composing the forward converter can be decreased and the radio interference against the power source can be alleviated by the reactance of the transformer T.

In this embodiment, the fact that three-phase AC power of a low frequency can be obtained by inversion of DC power by the inverter is utilized so that a rescue run of the elevator car CA can be made in the event of power failure. Referring to FIG. 5, an emergency switch-over contactor 15D (not shown), which is normally turned off, is turned on upon detection of interruption of power supplied from the AC power source U, V, W. Thus, the contacts 15Db and 15Da of the contactor 15D are opened and closed respectively thereby connecting a battery ED to the inverter. Therefore, by controlling the thyristors 41 to 46 composing the inverter and supplying the low-frequency AC power to the induction motor IM, the elevator car CA can be brought to the nearest floor while running at the low speed. Special means for permitting the rescue run in the event of power failure have been required in a conventional AC elevator control system. In contrast, according to the embodiment shown in FIG. 5, the rescue run can be simply attained by the provision of the battery ED and the contactor 15D.

In the final stage of deceleration of the elevator car CA, the DC braking torque can be applied by turning on the gate signal applied to the thyristors 42 and 45 only among those composing the inverter and by turning off the gate signal applied to the remaining thyristors. By so firing the selected thyristors 42 and 45, direct current flows through the windings u and w of the induction motor IM to generate a DC braking torque. The magnitude of this DC braking torque can be controlled by controlling the gate signal of the thyristors 31 to 36 composing the forward converter on the basis of the error between the speed command and the feedback speed.

Figure 6:
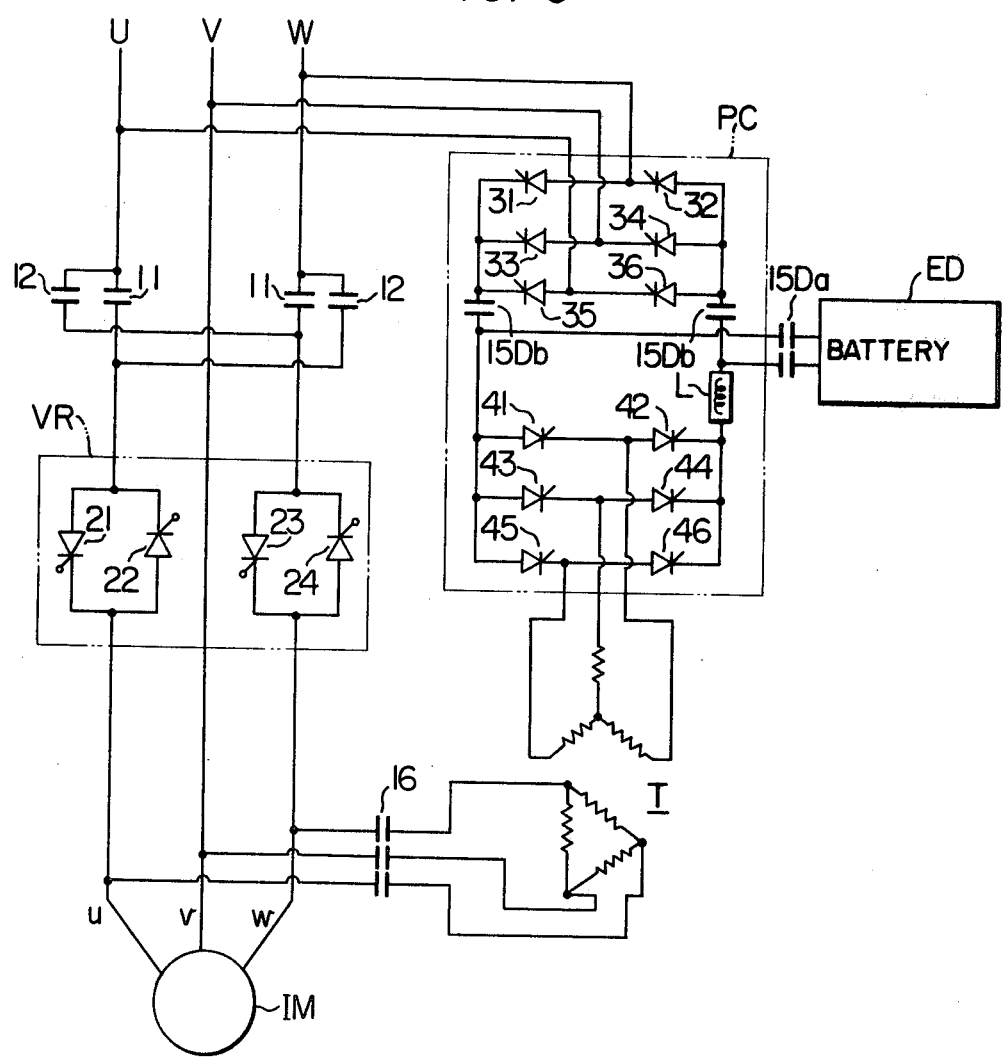
FIG. 6 is a circuit diagram of another embodiment of the AC elevator control system of the present invention in which a transformer is connected between the induction motor and the power converter unit.

FIG. 6 shows another embodiment of the present invention in which the transformer T is inserted between the power converter unit PC and the induction motor IM. In this case, contactors 16 are required between the transformer T and the induction motor IM so that current may not flow into the transformer T when the elevator car CA is accelerated.

Figure 7:
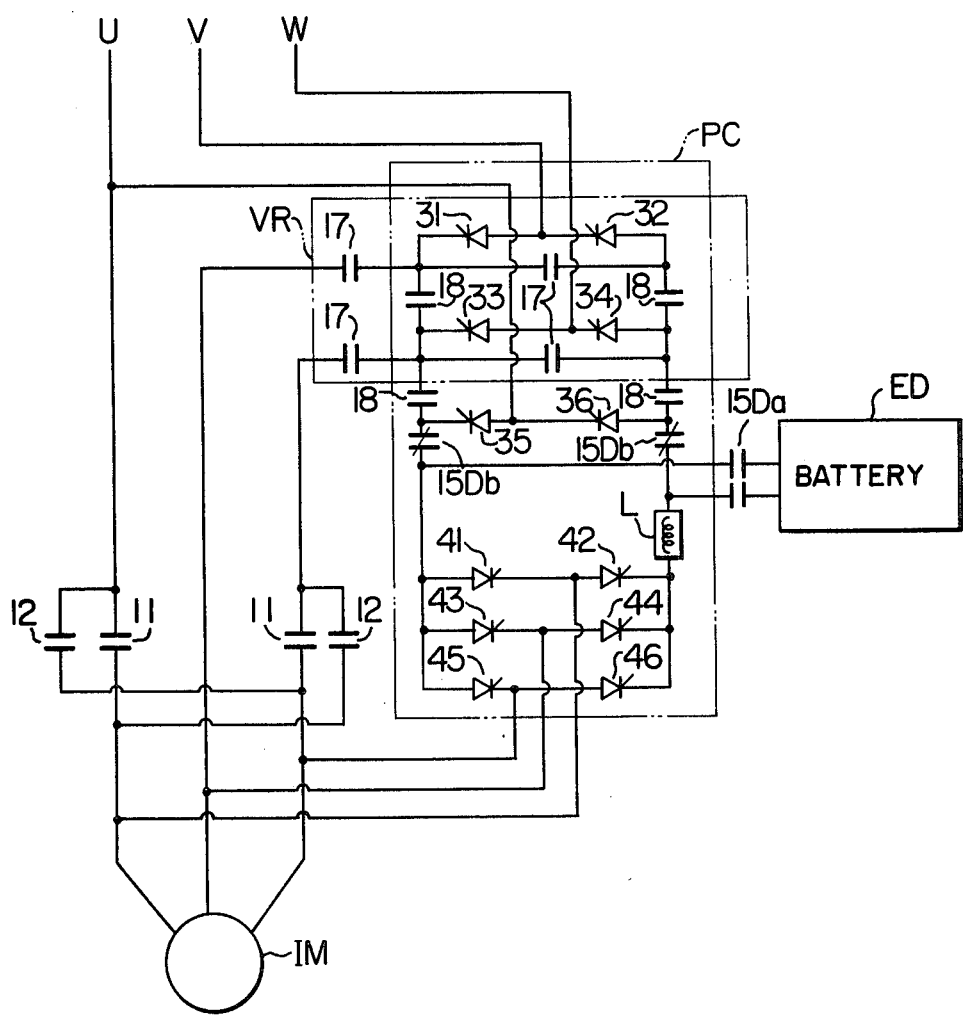
FIG. 7 is a circuit diagram of still another embodiment of the AC elevator control system of the present invention in which the motoring torque control unit and the power converter unit include parts common to each other.

FIG. 7 shows still another embodiment of the present invention in which the motoring torque control unit VR and the power converter unit PC include common thyristors. In this embodiment, the number of thyristors can be decreased, although contactors 17 for motoring purpose and contactors 18 for deceleration purpose are additionally required. Referring to FIG. 7, the contactors 17 are turned on in the motoring mode, and the anti-parallel circuits of thyristors 31, 32 and 33, 34 are inserted between the phases U, W of the AC power source and the windings u and w of the induction motor IM, thereby providing the same arrangement as that of the motoring torque control unit VR shown in FIG. 5. The contactors 17 and 18 are turned off and on respectively in the deceleration mode, thereby providing the same arrangement as that of the power converter unit PC shown in FIG. 5.

In the embodiment shown in FIG. 7, the contactors 11 and 12 are connected to the induction motor IM at a position nearer to the motor IM than the contactors 17 so as to make unnecessary the switch-over of the gate circuits of the thyristors.

The method of inserting a transformer as shown in the FIG. 6 embodiment is suitable for application also to the arrangement of FIG. 7 in which the motoring torque control unit VR and the power converter unit PC include thyristors common to each other, as described below.

Figure 8:
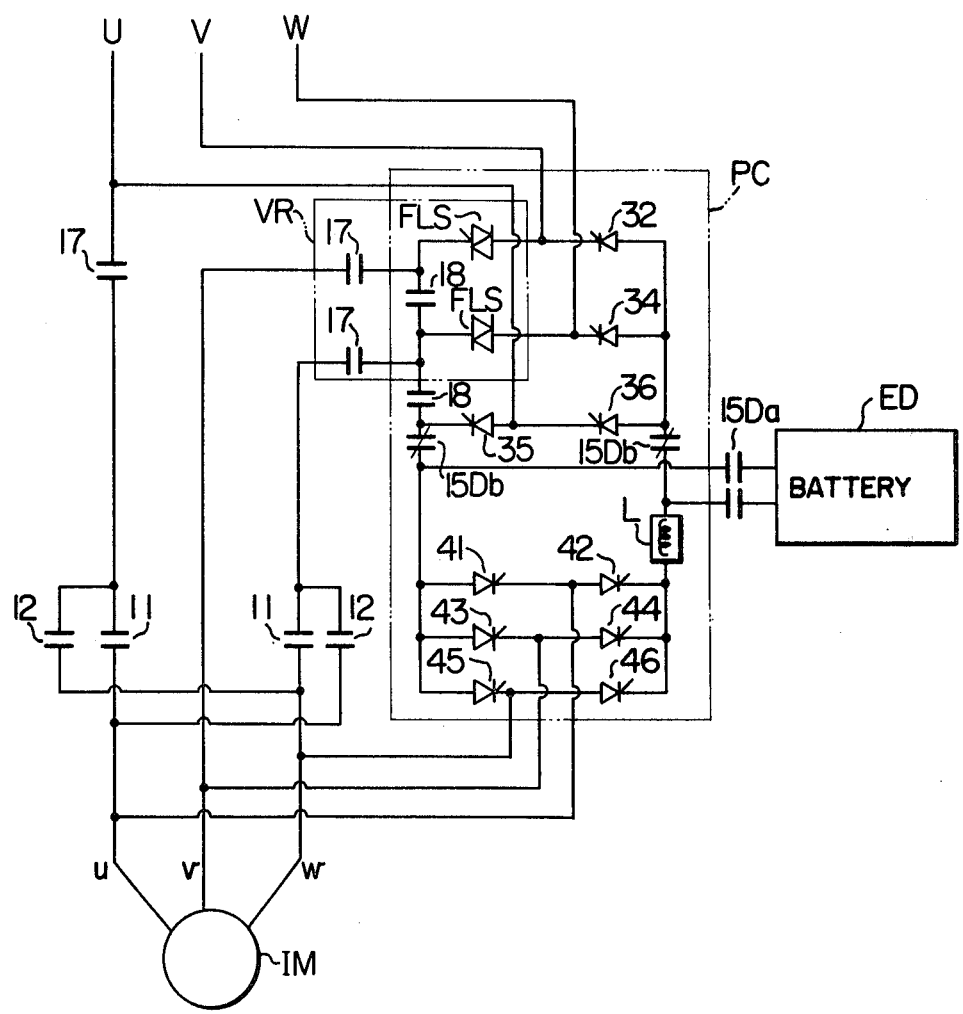
FIG. 8 is a circuit diagram of yet another embodiment of the AC elevator control system of the present invention in which bidirectional control elements are used in the power converter unit shown in FIG. 7.

FIG. 8 shows yet another embodiment of the present invention which is a modification of the embodiment shown in FIG. 7 in that the common thyristors 31 and 33 in the forward converter are replaced by bidirectional control elements FLS, respectively. In the embodiment shown in FIG. 7, all of the four common thyristors 31 to 34 are required to have a capacity large enough to control the induction motor IM. In contrast, in the embodiment shown in FIG. 8, the bidirectional controlled elements FLS only are required to have a large capacity, and the remaining ten thyristors need not have a large capacity. Further, the number of the contactors 17 and 18 can be decreased.

Figure 9:
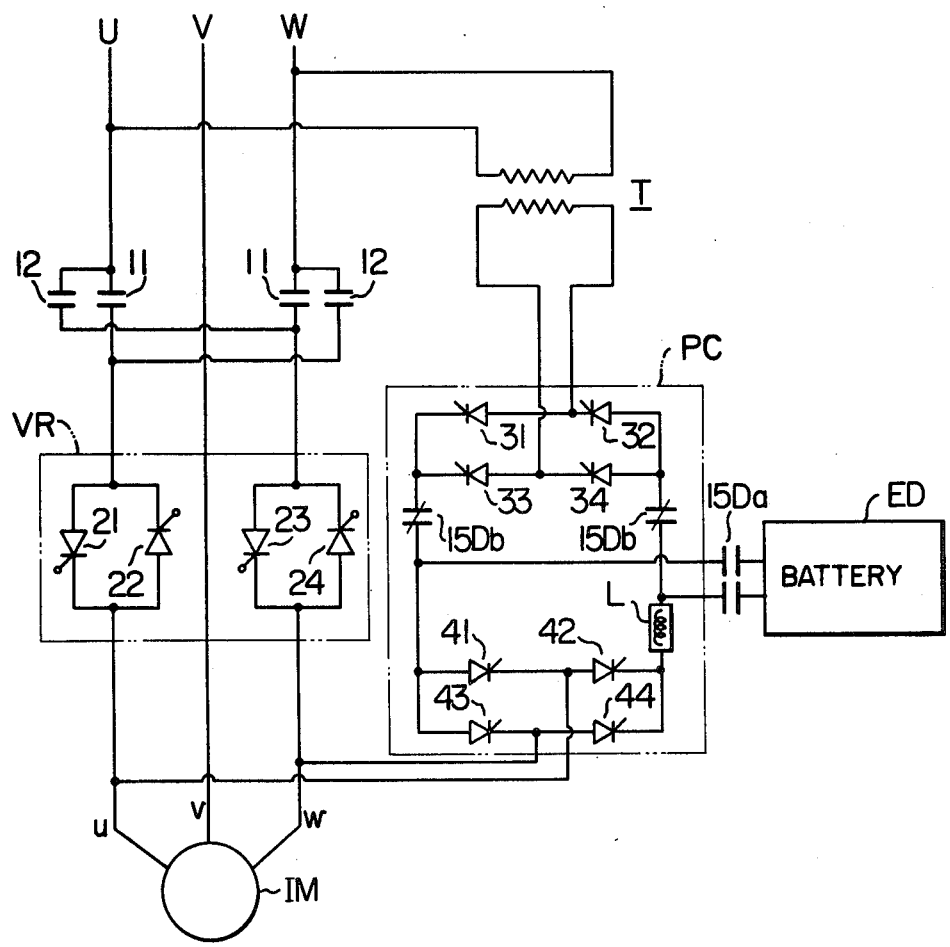
FIG. 9 is a circuit diagram of a further embodiment of the AC elevator control system of the present invention in which single-phase circuits are used to constitute the power converter unit.
Figure 11:
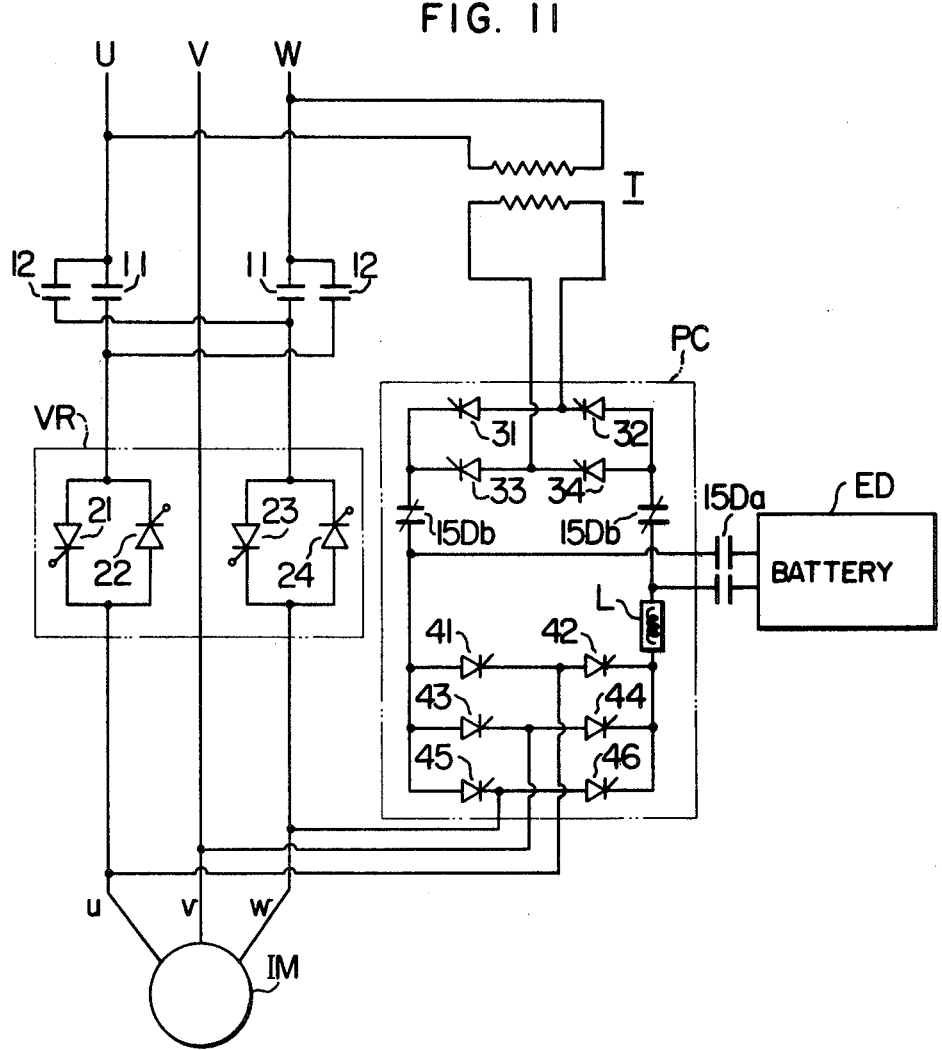
FIG. 11 is a circuit diagram of a still further embodiment of the AC elevator control system of the present invention in which single-phase circuits are used to constitute only the forward converter of the power converter unit.

FIGS. 9 and 11 show other embodiments of the present invention. In these embodiments, the power converter unit PC operates in the deceleration mode only so that the structure of the power converter unit PC can be simplified.

Figure 10:
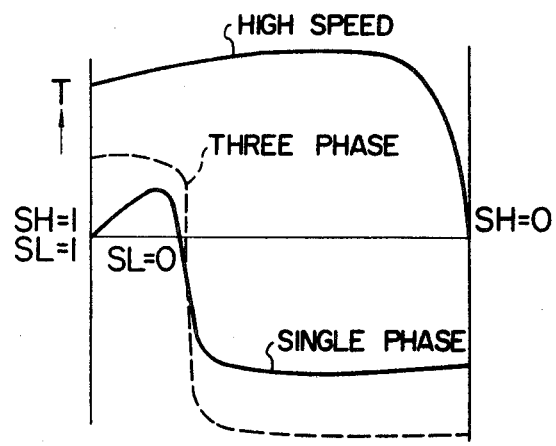
FIG. 10 is a graph showing the torque characteristics of the induction motor IM to illustrate the operation of the system shown in FIG. 9.

In the embodiment shown in FIG. 9, the power converter unit PC is entirely composed of single-phase circuits. Thus, this embodiment is featured by the fact that the regenerative braking torque is produced within the range of $S_L \leq O$ on the low-frequency single-phase torque curve, as shown in FIG. 10. Although the magnitude of the regenerative braking torque is less than that of the three-phase torque curve shown by the dotted line, in FIG. 10, the embodiment shown in FIG. 9 is economically greatly advantageous, in comparison with the embodiment of FIG. 5, in that the number of thyristors can be decreased to eight from twelve, and, also, a transformer T of single-phase can be used in place of the transformer T of three-phase.

The system shown in FIG. 9, in which the single-phase torque can only be produced, is burdened with such a problem that the starting torque cannot be obtained, and the elevator car CA cannot be run at a low speed under control of the power converter unit PC only. However, this problem can be easily solved by applying the necessary starting torque under control of the motoring torque control unit VR. Once started, the elevator car CA can be driven to run at the low speed.

The embodiment shown in FIG. 11 is a modification of the embodiment shown in FIG. 9 in that the inverter only is composed of a three-phase bridge circuit. Therefore, the elevator car CA can be run at a low speed for the maintenance and inspection purpose under control of the power converter unit PC only.

It is apparent to those skilled in the art that suitable combinations of the aforementioned embodiments can also exhibit corresponding effects.

What is claimed is:

1. An AC elevator control apparatus for use in an AC elevator system including a three-phase AC power source, a three-phase induction motor, and an elevator car and a counterweight suspended from the opposite ends of a rope trained around a rotatable member driven by said induction motor, said apparatus comprising:
   means for supplying AC power from said AC power source to said induction motor to control the motoring torque thereof; and
   a power converting unit including means for supplying AC power having a frequency lower than that of said AC power source to said induction motor at least when said induction motor operates in a deceleration mode.

2. An AC elevator control apparatus as claimed in claim 1, wherein said motoring torque control means includes switch means for connecting said three-phase induction motor to said three-phase AC power supply in a direction of phase rotation corresponding to a desired running direction of the elevator car.

3. An AC elevator control apparatus as claimed in claim 1, wherein said motoring torque control means includes anti-parallel-connected thyristors or bidirectional controlled elements inserted in at least one phase between said three-phase AC power source and said three-phase induction motor.

4. An AC elevator control apparatus as claimed in claim 1, wherein said power supplying means of said power converting unit is constructed to supply AC power of a fixed predetermined low frequency.

5. An AC elevator control apparatus as claimed in claim 1, wherein said power supplying means of said power converting unit is constructed to supply AC power of a plurality of predetermined different frequencies, and the AC power of one of the plurality of predetermined frequencies corresponding to the position of the elevator car is selected to be supplied to said induction motor.

6. An AC elevator control apparatus as claimed in claim 1, wherein said power supplying means of said power converting unit includes converter means for converting the AC power supplied from said three-phase AC power source into DC power, and inverter means for converting said DC power into AC power of a frequency lower than that of said AC power source.

7. An AC elevator control apparatus as claimed in claim 6, wherein said converter converts means AC power of a selected single-phase supplied from said three-phase AC power source into DC power, and said inverter means converts said DC power into single-phase AC power.

8. An AC elevator control apparatus as claimed in claim 6, wherein said converter means converts AC power of a selected single-phase supplied from said three-phase AC power source into DC power, and said inverter means converts said DC power into three-phase AC power.

9. An AC elevator control apparatus as claimed in claim 6, wherein said converter means is constituted by a thyristor bridge circuit, and including switch means for inserting selected ones of the thyristors in said bridge circuit between said AC power source and said induction motor so as to control the motoring torque by said thyristors inserted between said AC power source and said induction motor.

10. An AC elevator control apparatus for use in an AC elevator system including a three-phase AC power source, a three-phase induction motor, and an elevator car and a counterweight suspended from the opposite ends of a rope trained around a rotatable member and driven by said induction motor, said apparatus comprising:
means for supplying AC power from said AC power source to said induction motor to control motoring torque thereof; and
a power converting unit for supplying AC power of a frequency lower than that of said AC power source to said induction motor at least when said induction motor operates in a deceleration mode, including a converter converting the AC power supplied from said three-phase AC power source into DC power, and an inverter converting said DC power into AC power of a frequency lower than that of said AC power source, said converter being constituted by a thyristor bridge circuit, said switch means are provided for inserting selected ones of the thyristors in said bridge circuit between said AC power source and said induction motor so as to control the motoring torque by said thyristors inserted between said AC power source and said induction motor, at least one of the arms of said bridge circuit including a bidirectional controlled element, said bidirectional controlled element being inserted by said switch means between said AC power source and said induction motor.

11. An AC elevator control apparatus for use in an AC elevator system including a three-phase AC power source, a three-phase induction motor, and an elevator car and a counterweight suspended from the opposite ends of a rope trained around a rotatable member and driven by said induction motor, said apparatus comprising:
means for supplying AC power from said AC power source to said induction motor to control motoring torque thereof; and
a power converting unit for supplying AC power of a frequency lower than that of said AC power source to said induction motor at least when said induction motor operates in a deceleration mode, including a converter converting the AC power supplied from said three-phase AC power source into DC power, and an inverter converting said DC power into AC power of a frequency lower than that of said AC power source, wherein a transformer is connected between said AC power source and said converter.

12. An AC elevator control apparatus for use in an AC elevator system including a three-phase AC power source, a three-phase induction motor, and an elevator car and a counterweight suspended from the opposite ends of a rope trained around a rotatable member and driven by said induction motor, said apparatus comprising:
means for supplying AC power from said AC power source to said induction motor to control motoring torque thereof; and
a power converting unit for supplying AC power of a frequency lower than that of said AC power source to said induction motor at least when said induction motor operates in a deceleration mode, including a converter converting the AC power supplied from said three-phase AC power source into DC power, and an inverter converting said DC power into AC power of a frequency lower than that of said AC power source, wherein a transformer is connected between said inverter and said induction motor.

13. An AC elevator control apparatus for use in an AC elevator system including a three-phase AC power source, a three-phase induction motor, and an elevator car and a counterweight suspended from the opposite ends of a rope trained around a rotatable member driven by said induction motor, said apparatus comprising:
a thyristor bridge circuit connected at its AC input terminals to said AC power source;
switch means for acceleration purpose for short-circuiting between a DC side of a selected one of the arms constituting said bridge circuit and connecting the short-circuited points to said induction motor when said induction motor operates in a motoring mode;
an inverter connected at its AC output to said induction motor; and
switch means for deceleration purpose for connecting the DC side of said thyristor bridge circuit to the DC input of said inverter when said induction motor operates in a deceleration mode in response to the turning-off of said acceleration-purpose switch means.

14. An AC elevator control apparatus for use in an AC elevator system including a three-phase power source, a three-phase induction motor, and an elevator car and a counterweight suspended from the opposite ends of a rope trained around a rotatable member driven by said induction motor, said apparatus comprising:

a full-wave bridge circuit connected at its AC input to said AC power source and including a bidirectional controlled element connected in at least one of the arms thereof;

switch means for acceleration purpose for connecting the DC output of said full-wave bridge circuit, which provides one end of said bidirectional controlled element, to said induction motor when said induction motor operates in a motoring mode;

an inverter connected at its AC output to said induction motor; and switch means for deceleration purpose for connecting the DC output of said full-wave bridge circuit to the DC input of said inverter when said induction motor operates in a deceleration mode in response to the turning-off of said acceleration-purpose switching means.

15. An AC elevator control apparatus for use in an AC elevator system including a three-phase AC power source, a three-phase induction motor, and an elevator car and a counterweight suspended from the opposite ends of a rope trained around a rotatable member driven by said induction motor, said apparatus comprising:

forward converter means for full-wave rectification of the AC power supplied from said AC power source;

inverter means for converting the DC power generated from said forward converter means into AC power of a frequency lower than that of said AC power source to supply the AC power of the lower frequency to said induction motor;

a DC power supply and switch means for selectively connecting said DC power supply to the DC input of said inverter.

16. An AC elevator control apparatus according to claim 15, wherein said DC power supply is a battery and said switch means includes means for selectively connecting said battery to the input of said inverter means while disconnecting the output of said forward converter means from the input of said inverter means.

17. An AC elevator control apparatus for use in an AC elevator system including a three-phase AC power source, a three-phase induction motor, and an elevator car and a counterweight suspended from the opposite ends of a rope trained around a rotatable member driven by said induction motor, said apparatus comprising:

a motoring torque control unit connected to said AC power source and including means for supplying AC power from said AC power source to said induction motor under duty-cycle control to control the motoring torque thereof during acceleration and normal running of said elevator car; and a power converting unit connected to said AC power source and including means for supplying AC power having a frequency significantly lower than that of said AC power source to said induction motor at least during deceleration of said elevator car to effect regenerative braking thereof.

18. An AC elevator control apparatus according to claim 17, wherein the frequency of the AC power supplied from said power converting unit to said induction motor is between one-fifth and one-tenth of the frequency of said AC power source.

19. An AC elevator control apparatus according to claim 17, wherein a transformer is connected in series with said power converting unit between said AC power source and said induction motor.

20. An AC elevator control apparatus as claimed in claim 17, wherein said power supplying means of said power converting unit includes converter means for converting the AC power supplied from said three-phase AC power source into DC power, and inverter means for converting said DC power into AC power of a frequency lower than that of said AC power source.

21. An AC elevator control apparatus according to claim 20, further including a DC power supply and switch means for selectively connecting said DC power supply to the input of said inverter means while disconnecting the output of said converter means from the input of said inverter means to selectively effect low speed running of said elevator car or regenerative braking of said elevator car during failure of said AC power source.

* * * * *